(12) United States Patent
Gaudin et al.

(10) Patent No.: US 8,453,436 B2
(45) Date of Patent: Jun. 4, 2013

(54) AFTERTREATMENT INJECTOR ANTI-FOULING DEVICE

(75) Inventors: Bruno Gaudin, Chozeau (FR); Philip Meier, Williamsport, MD (US)

(73) Assignee: Mack Trucks, Inc., Greensboro, NC (US)

( * ) Notice: Subject to any disclaimer, the term of this patent is extended or adjusted under 35 U.S.C. 154(b) by 592 days.

(21) Appl. No.: 12/530,032

(22) PCT Filed: Mar. 7, 2008

(86) PCT No.: PCT/US2008/003186
§ 371 (c)(1), (2), (4) Date: Jan. 29, 2010

(87) PCT Pub. No.: WO2008/112211
PCT Pub. Date: Sep. 18, 2008

(65) Prior Publication Data
US 2010/0146951 A1 Jun. 17, 2010

Related U.S. Application Data

(60) Provisional application No. 60/905,791, filed on Mar. 8, 2007.

(51) Int. Cl.
*F01N 3/00* (2006.01)
*F23D 14/50* (2006.01)

(52) U.S. Cl.
USPC .............................................. 60/295; 239/112

(58) Field of Classification Search
USPC ................... 60/286, 295, 303; 239/106, 107, 239/108, 112, 431, 434
See application file for complete search history.

(56) References Cited

U.S. PATENT DOCUMENTS

| | | | | | |
|---|---|---|---|---|---|
| 2,812,212 | A | * | 11/1957 | Rogers et al. | 239/430 |
| 2,965,303 | A | * | 12/1960 | Jackson | 239/132.5 |
| 3,272,441 | A | * | 9/1966 | Davis, Sr. et al. | 239/403 |
| 4,175,706 | A | * | 11/1979 | Gerstmann | 239/414 |
| 4,219,157 | A | | 8/1980 | Binoche | |
| 4,349,153 | A | | 9/1982 | Johnson | |
| 4,798,330 | A | | 1/1989 | Mancini et al. | |
| 5,522,218 | A | | 6/1996 | Lane | |
| 5,931,654 | A | | 8/1999 | Chamberland | |
| 6,192,677 | B1 | | 2/2001 | Tost | |
| 6,279,603 | B1 | * | 8/2001 | Czarnik et al. | 137/339 |
| 6,758,420 | B2 | | 7/2004 | Arioka et al. | |
| 6,814,303 | B2 | | 11/2004 | Edgar et al. | |

(Continued)

OTHER PUBLICATIONS

PCT Written Opinion of the International Searching Authority—Jun. 19, 2008—four pages.

(Continued)

*Primary Examiner* — Kenneth Bomberg
*Assistant Examiner* — Dapinder Singh
(74) *Attorney, Agent, or Firm* — Martin Farrell; Michael Pruden

(57) ABSTRACT

An anti-fouling device for an internal combustion engine aftertreatment injector includes a member mountable as an interface between an exhaust conduit and the aftertreatment injector. The member has an inlet to receive air from an air source, and is formed with a passageway to guide the received air to at least one outlet to direct the air to a nozzle of the injector. The air flow surrounds the nozzle to prevent or inhibit exhaust gas from the exhaust conduit from contacting the nozzle.

9 Claims, 5 Drawing Sheets

U.S. PATENT DOCUMENTS

| | | |
|---|---|---|
| 7,007,864 B2 | 3/2006 | Snyder et al. |
| 7,021,047 B2 | 4/2006 | Hilden et al. |
| 7,168,241 B2 | 1/2007 | Rudelt et al. |
| 7,625,201 B2 * | 12/2009 | Ingalls et al. ............ 431/18 |
| 2005/0056004 A1 | 3/2005 | Kakwani et al. |
| 2005/0224060 A1 | 10/2005 | Hill et al. |
| 2006/0153748 A1 | 7/2006 | Huthwohl et al. |
| 2006/0162325 A1 | 7/2006 | Darley et al. |
| 2008/0209897 A1 * | 9/2008 | Urven et al. ............ 60/303 |
| 2008/0295500 A1 * | 12/2008 | Cox et al. ............ 60/295 |

OTHER PUBLICATIONS

Supplementary European Search Report dated Jan. 12, 2011 for corresponding application No. EP 08726682.

* cited by examiner

AFTERTREATMENT INJECTOR ANTI-FOULING DEVICE

FIELD OF THE INVENTION

The invention relates to internal combustion engine exhaust systems and devices for injecting hydrocarbons and/or other substances into an exhaust gas flow of an internal combustion engine.

BACKGROUND AND SUMMARY OF THE INVENTION

Stringent emissions regulations such as those imposed by U.S. and European regulatory officials have progressively reduced the amount of diesel particulate matter (DPM) and other gaseous constituents such as NOx allowed in the exhaust gases of diesel engines. The emissions levels proposed by the US07 and Euro 5 regulations are so low that they can be currently met only with the use of exhaust aftertreatment devices. A diesel particulate filtration device (DPF) is an example of a device which may be used to comply with particulate emissions levels in a diesel engine. A diesel oxidation catalyst (DOC) may be used to convert hydrocarbons and carbon monoxide to carbon dioxide and water vapor. A DOC can also be used in conjunction with a DPF device to raise the temperature of the DPF for regeneration, that is, removing collected carbon particulate matter. Lean NOx absorbers and Selective Catalytic Reduction (SCR) devices are examples of systems used for reducing NOx in the exhaust gases.

It is necessary at times to inject substances into the engine exhaust to facilitate or initiate a function of an aftertreatment device. With diesel particulate filters, for example, it is sometimes necessary to raise the temperature of the exhaust gas to oxidize the collected particulate matter in the filter for removal, a process known as regeneration. Regeneration may be done by methods including injecting hydrocarbons into the exhaust flow.

One method is to inject a hydrocarbon into the exhaust gas and use a catalytic device that elevates exhaust gas temperature by catalytically oxidizing the injected hydrocarbon. FIG. 1 shows schematically an internal combustion engine 5 with an exhaust system layout including a stack pipe or tailpipe 10, which disperses the exhaust gas to the environment, and exhaust aftertreatment devices, in this illustration, a diesel particulate filter 12, and a diesel oxidation catalyst 14. FIG. 1 shows an injection device 16 mounted on the exhaust downstream of the exhaust side of the turbine 18 of a turbocompressor. Hydrocarbon injected by the injector 16 mixes with the exhaust gas and is oxidized when it comes into contact with the catalyst, releasing heat energy. The heated gases enter the diesel particulate filter and cause much of the accumulated particulate matter to oxidize.

A problem with an injector mounted on an exhaust conduit is that particulate matter in the exhaust gases, which prior to the aftertreatment devices has not been filtered out, tends to collect on and foul the injector nozzle. This fouling or accumulated carbon deposits, can block the nozzle outlet or disrupt the flow pattern of the nozzle. A fouled nozzle requires cleaning, which results in vehicle downtime and maintenance costs.

According to the invention, fouling can be prevented or diminished by creating a positive flow of air or another clean gas around the nozzle to inhibit the flow of exhaust gases from reaching the nozzle.

The invention proposes a device that can be mounted between the injector and the exhaust conduit that guides a flow of air or another clean gas to the nozzle. In its simplest form, a device in accordance with the invention includes a plate-shaped member having a bore to provide communication between the nozzle of the injector and an opening in the exhaust conduit. The plate-shaped member includes an inlet to receive air from an air source, and has defined therein a passageway to guide the received air to at least one outlet. The at least one outlet directs the air into a space around the nozzle, the space being defined at least in part by the bore. The device directs air or another gas into a cavity in which a hydraulic flow nozzle is disposed to maintain a constant or nearly constant outward flow of gas so as to prevent the ingress of particles, materials or other contaminants that could be in the environment outside of the cavity (that is, the exhaust conduit 20).

Alternatively, rather than being formed as a separate member, the anti-fouling device may be integrated into an injector outside the nozzle or integrated into the wall of an exhaust conduit 20.

According to the invention, the at least one outlet may be formed in the member in a position so that air exiting the outlet surrounds the injector nozzle, either directly of indirectly. The at last one outlet may be formed in a wall defining the bore to direct a flow of air at the nozzle.

The at least one outlet may be formed as a hole. Alternatively, the at least one outlet may be formed as an air jet or nozzle shaped opening. According to another alternative, the at least one outlet may be formed as a slot in the wall defining the bore. Other outlet shapes may be used.

According to one embodiment, the bore may be shaped to define a cavity to receive the nozzle, the cavity defining the space around the nozzle and opening to an aperture to allow the injection of hydrocarbon or other substance from the injector into the exhaust pipe.

According to another embodiment, the plate member includes a recess area surrounding the bore on a side that mates with the injector, which defines an annular gap around the injector nozzle. The passageway guides air to the recess area and annular gap, which causes the air to form a ring-shaped curtain around the nozzle. The passageway may be formed in part by a space between the injector body and a top surface of the plate.

According to the invention, an anti-fouling device delivers air or another gas at a pressure higher than the pressure of exhaust gases in the exhaust conduit to hinder exhaust gas from contacting the injector nozzle.

According to the invention, an anti-fouling device delivers air or another gas to a vicinity of an injector nozzle with sufficient velocity to prevent or hinder exhaust gas from contacting the nozzle.

BRIEF DESCRIPTION OF THE DRAWINGS

The invention will be better understood by reference to the detailed description in conjunction with the appended drawings, in which.

DETAILED DESCRIPTION

Figure 1:
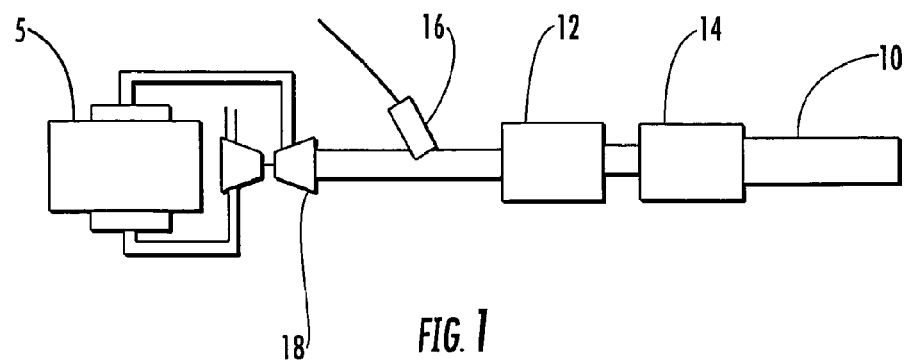
FIG. 1 is a schematic drawing of an exhaust system of a heavy truck having aftertreatment devices and a hydrocarbon injector for regeneration of the devices.
Figure 2:
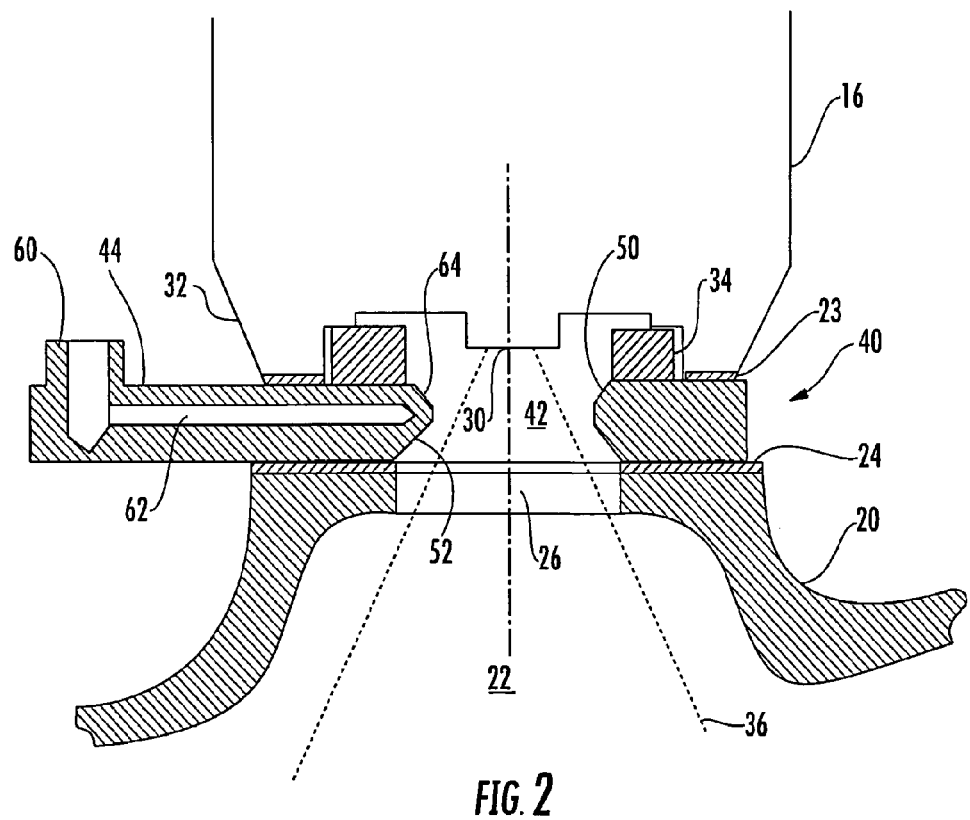
FIG. 2 is a section view of an anti-fouling device in accordance with one embodiment of the invention mounted between an injection device and an exhaust pipe.

Referring to FIG. 2, a first embodiment of an anti-fouling device 40 in accordance with the invention is shown mounted on an exhaust conduit 20 between the exhaust conduit and a hydrocarbon injector 16. The device 40 in accordance with the invention is shown and described in the various embodiments as a plate shaped element, which here means a body capable of forming an interface between the injector and the exhaust conduit having features as described below. The anti-fouling device 40 of FIG. 2 is shown in top view in FIG. 3 and bottom view in FIG. 4.

The injector 16 includes a nozzle 30 surrounded by a rim 32 that defines a space or cavity in which the injector nozzle is disposed. An insulating element 34 or a spacing element may be disposed radially inward of the rim 32 and is compressed between the injector 16 and a top surface 44 of the anti-fouling device 40. A first gasket 23 is positioned between the rim 32 and the top surface 44 of the device 40 to form a seal between the injector body 16 and the top surface. A second gasket 24 seals the anti-fouling device 40 to the exhaust pipe 20. The assembly of injector 16 and anti-fouling device 40 may be mounted to the exhaust pipe 20 by any convenient means, and for example, by threaded fasteners (not shown) extending through mounting holes in the injector 16 and aligned mounting holes 46, 48 in the anti-fouling device, and secured to threaded holes (not illustrated) formed in the wall of the exhaust pipe.

In the case of an injector not having a rim 32 as shown in FIG. 2, the anti-fouling device 40 can include an upstanding collar to space the injector from the top surface of the anti-fouling device to create a cavity around the injector nozzle.

Figures 3, 4:
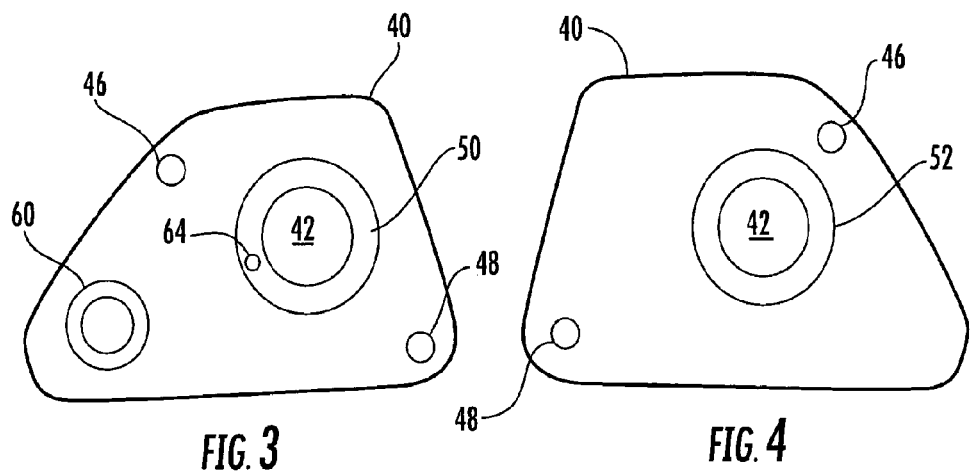
FIG. 3 is a top view of the anti-fouling device of FIG. 2.
FIG. 4 is a bottom view of the anti-fouling device of FIG. 2.

The anti-fouling device 40 shown in FIGS. 2, 3 and 4 is a plate-like element having a centrally located bore defined by an upward facing frustoconical surface or chamfer 50 and a downward facing frustoconical surface or chamfer 52 meeting at a throat area 42. The chamfer surfaces 50, 52 and throat 42 define an hourglass space, and together with the space bounded by the injector rim 32 and insulating element 34, define a cavity for the nozzle 30. The bore, which includes the chamfers 50, 52 and the throat 42, is aligned with and opens to an aperture 26 in the exhaust pipe 20 to allow the injector 16 to inject hydrocarbon into an exhaust conduit interior 22. A spray pattern 36 as may be produced by the nozzle 30 is indicated by the broken lines 36.

The anti-fouling device 40 includes an inlet 60 to receive air or another gas under pressure from a source (not illustrated). A passageway 62 formed in the plate member 40 connects the air inlet 60 to the upward facing chamfer 50 and includes an outlet 64 formed as an air jet, which is directed toward the injector nozzle 30. The outlet 64 directs a flow of air under pressure onto the injector nozzle 30, with sufficient volume of air to provide a flow of air in a vicinity of the injector nozzle 30 and outward from the nozzle cavity. The outward flow of air prevents the ingress of exhaust gases into the cavity, thus preventing fouling of the nozzle 30. Preferably, the air or gas from the source is at a pressure higher than a pressure of exhaust gas in the exhaust conduit interior 22. Further, it is desired that the air or gas flow, at least in the vicinity of the injector nozzle 30 be at a velocity sufficiently high to prevent or hinder exhaust gas from contacting the injector nozzle 30.

The outlet 64 may alternatively be formed as two or more outlets arranged on the upward facing chamfer 50 with appropriate modification of the passageway 62 to supply the outlets. For example, a second outlet may be positioned opposite the outlet 64 shown in FIGS. 2 and 3. If more than two outlets are used, they may be equally dispersed about the upward facing chamfer 50. According to yet another alternative, the outlets (air jets or nozzles) may be directed to create a swirl pattern or vortex surrounding the injector nozzle 30. Alternatively, the outlet may be formed as one or more arc shaped or slotted outlets, or as a ring-shaped aperture in the upward facing chamfer 50. These alternative arrangements may be formed by making the device 40 in two plates that are bonded after the passageways and apertures are formed.

Figure 5:
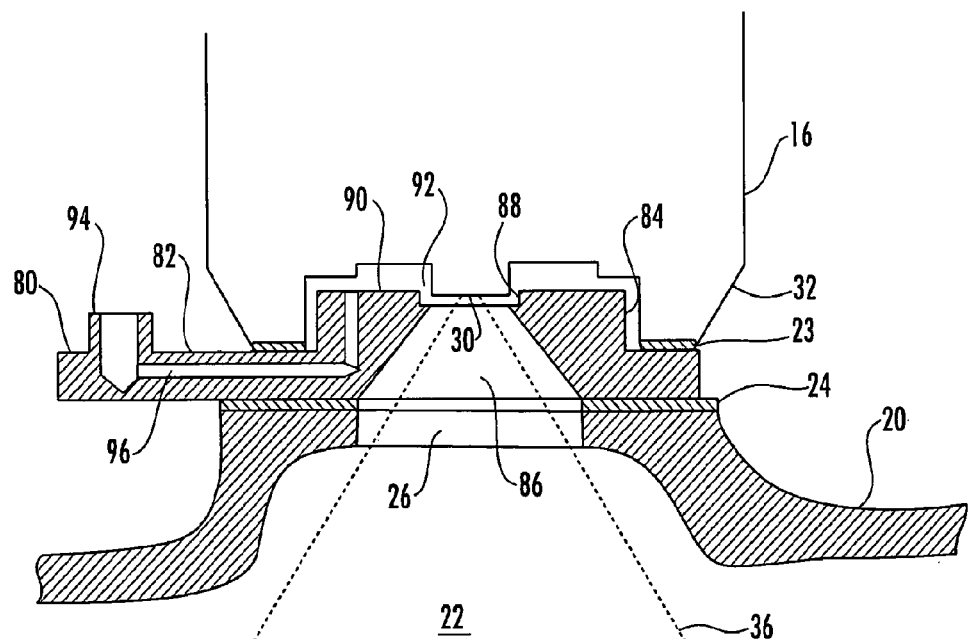
FIG. 5 is section view of an anti-fouling device in accordance with an alternative embodiment of the invention mounted between an injection device and exhaust pipe.
Figure 6:
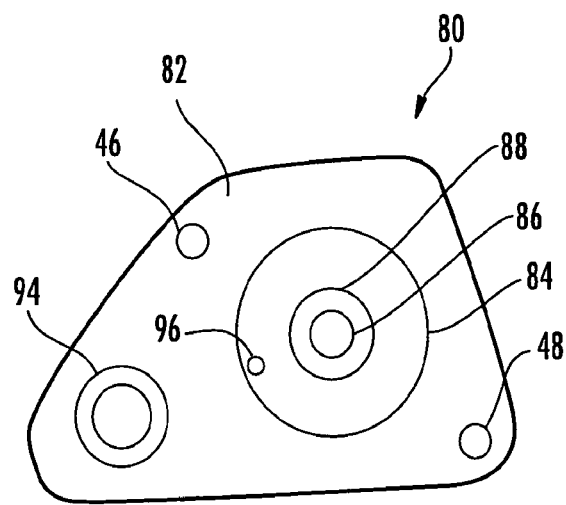
FIG. 6 is a top view of the anti-fouling device of FIG. 5.
Figure 7:
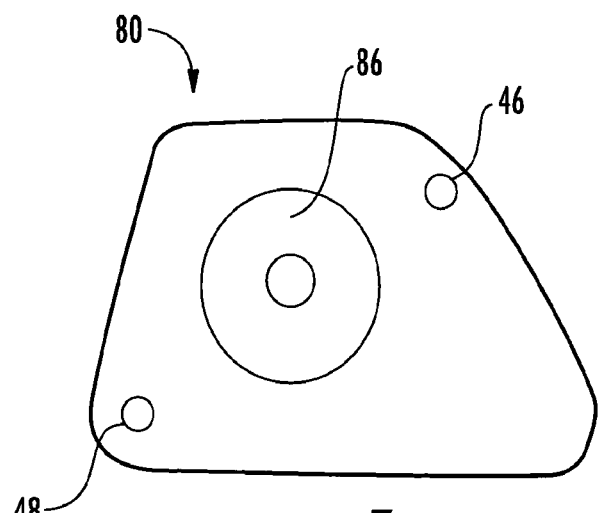
FIG. 7 is a bottom view of the anti-fouling device of FIG. 5.

FIG. 5 illustrates in section view an alternative embodiment of the anti-fouling device 80. FIG. 6 is a top view and FIG. 7 is a bottom view of the anti-fouling device 80 of FIG. 5. The injector 16 and exhaust conduit 20 are identical to those illustrated in FIG. 2. In the embodiment of FIG. 5, the insulating element is omitted and the injector 16 is sealed to the top surface 82 of the anti-fouling device 80 by second gasket 23.

The anti-fouling device 80 of FIG. 5 includes a centrally located upstanding boss 84. A frustoconical bore 86 is formed in the boss 84 and body of the anti-fouling device 80, and diverges, that is, expands, downward from a top surface 90 of the boss. A shallow countersunk hole 88 forms a throat or entrance to the bore 86. The boss 84 has a height relative to the rim 32 that spaces the top surface 90 from the injector 16 to define a cavity or intermediate space between the injector 16 and the top surface 90 of the boss. The throat 88 defines a cavity or annular orifice 92 around the nozzle 30.

An inlet 94 for receiving air from an air source is formed on the top surface 82 of the anti-fouling device. A passageway 96 leads from the air inlet 94 to the top surface 90 of the boss 84. Air flowing through the passageway 96 fills the cavity between the injector and the top surface 90 of the boss 84 and flows through the annular orifice 92 as a ring curtain of air surrounding the nozzle 30. The passageway 96 may be formed with additional openings on the top surface 90 of the boss 84 to improve the flow of air into the cavity. Air is provided in sufficient volume to create an outward flow of air into the exhaust diffuser 22 to prevent the ingress of exhaust gas into the bore area 86. In addition, the air is provided at a pressure higher than the pressure of the exhaust gas in the conduit interior 22. Further, the air velocity in the vicinity of the injector nozzle 30 is sufficiently high to prevent or hinder the exhaust gas from contacting the injector nozzle 30.

As contemplated by the invention, the air source could be derived from the vehicle's pneumatic system, a turbocharger, supercharger system, or any convenient source of air. For example, a dedicated air supply device could be provided, which could be powered by the vehicle electrical system.

The air flow delivered to the nozzle may be a continuous flow or alternatively, a pulsed flow.

Figure 8:
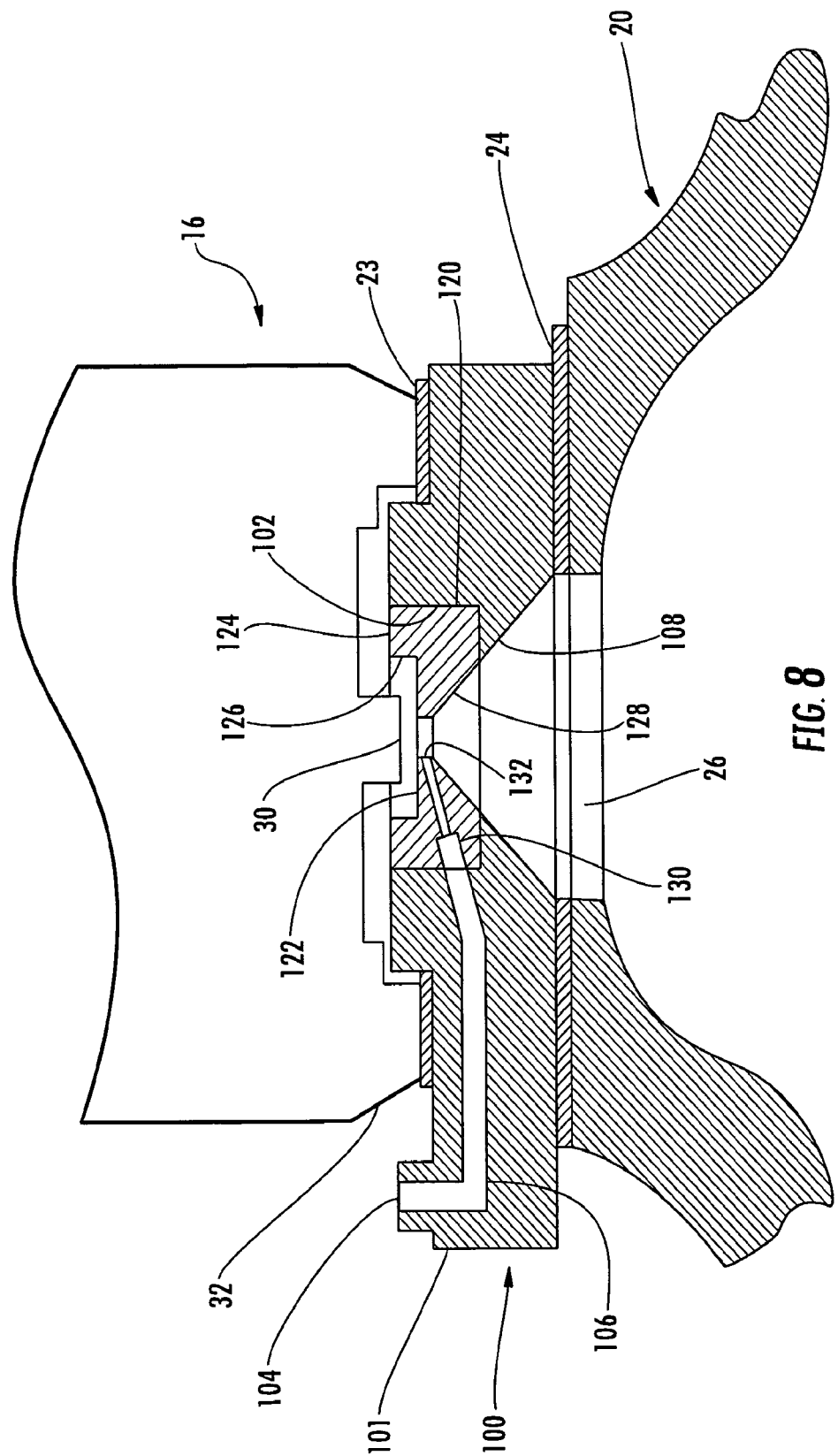
FIG. 8 is a section view of another alternative embodiment of the invention showing an anti-fouling device made in two parts.

FIG. 8 shows an alternative embodiment of the plate member 100 of the invention formed as a base 101 and an insert part 120. As in the other embodiments, the injector 16 and exhaust conduit 20 are the same, and the plate member 100 is disposed between the injector and the opening 26 on the exhaust conduit. According to this embodiment, an insert part is made separately to facilitate forming the bore and the internal passageway for received air.

Figure 9:
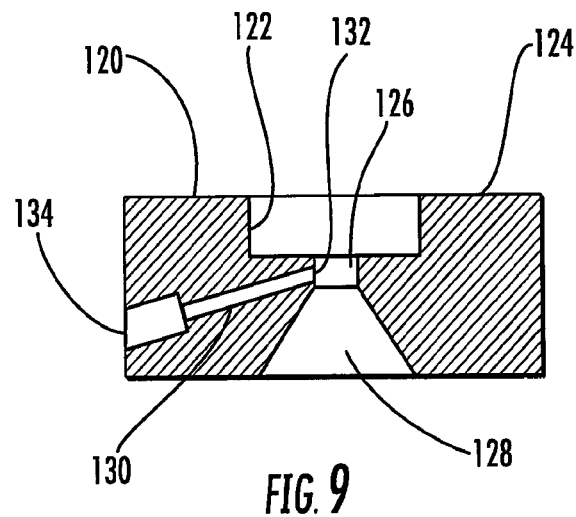
FIG. 9 is a side section view of an insert part of the embodiment of FIG. 8; and, FIG. 10 is a top view of the insert part of FIG. 9.
Figure 10:
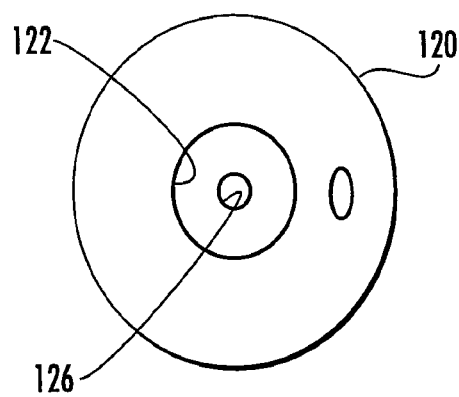

FIG. 9 shows a front section view of an insert part 120 according to one embodiment. FIG. 10 shows a top view of the insert part 120 of FIG. 9. FIG. 8, for purposes of illustration, includes a representation of the insert part 120 of FIG. 9. The insert part may be secured in the base member in any appropriate manner.

The plate member 100 is formed with a recess or seat 102 to accept an insert part 120. The plate member 100 includes an inlet 104 for receiving air from an air source and an internally formed passageway 106 to guide the received air to the seat 102. The plate member 100 includes a bore 108 formed as a frustoconical hole diverging toward the exhaust conduit 20 and aligned with the opening 26 in the exhaust conduit.

The insert part 120 includes a bore formed in three parts, a recess 122 opening on a top surface 124 of the insert part, a throat 126 communicating with the recess 122 and disposed for alignment with the nozzle 30 of the injector 16, and a frustoconical hole 128 communicating with the throat and diverging toward the frustoconical bore 108 in the plate member 100. The frustoconical hole 126 in the insert part 120 and the frustoconical bore 104 in the plate member 100 form a continuous frustoconical outlet from the throat 126 to the opening 26 in the exhaust conduit 20.

The insert member 120 also includes a flow passage 130 for air terminating in an outlet 132, in this case formed as an air jet, opening on the throat 126. An entrance 134 to the flow passage 130 aligns with and communicates with the passageway 106 formed in the plate member 100 to receive air guided therethrough.

The air pressure and flow rate of air for the device will need to be determined by the operating characteristics of the engine and exhaust conduit on which the device of the invention is used. It is currently contemplated that the air supply will be unregulated. Alternatively, if necessary or desirable, the air supply may be regulated or actively controlled, as may best deliver air from the selected air source, which as mentioned, may be the vehicle pneumatic system, turbocharger system or supercharger system as sources or from a dedicated air supply device.

The anti-fouling device is illustrated and described as a separate element disposed between the injector 16 and the exhaust conduit 20; however, those skilled in the art will recognize that the device may be integrated into the injector body outside of the nozzle or alternatively integrated into the wall of the exhaust conduit.

The invention has been described in terms of exemplary embodiments, structure, and components and those skilled in the art will understand that the scope of the invention is defined by the appended claims and equivalents and substitutions may be made without departing from the scope of the claims.

What is claimed is:

1. An anti-fouling device for an exhaust aftertreatment injector of an exhaust aftertreatment system for an internal combustion engine, comprising:
a member positionable between an opening on an exhaust conduit and an exhaust aftertreatment injector, the member being plate shaped and having a bore for alignment with a nozzle of the injector and the opening on the exhaust conduit to allow a flow from the nozzle through the bore into the opening on the exhaust conduit, wherein the member is formed as a base part and an insert part, the base part having a seat for the insert part, wherein the bore is formed by aligned holes in the base part and the insert part,
and wherein the bore is defined by a throat section opening to a frusto-conical shaped section widening toward an exhaust conduit side of the member, the member having an inlet for receiving air from an air source, and having a passageway formed by aligned passages in the base part and the insert part to guide air from the inlet to at least one outlet opening on a surface bounding the throat section, the at least one outlet being oriented to direct air across a space bounded by the bore to the nozzle.

2. The device of claim 1, wherein the at least one outlet is formed as a nozzle on a surface bounding the bore to direct air at an injector nozzle location.

3. The device of claim 1, wherein the at least one outlet is formed as a slot on the surface bounding the bore.

4. The device of claim 1 wherein the bore is further defined by a second frusto-conical shaped section widening toward an injector side of the member, the throat section defined by a juncture of the second frusto-conical section and the frusto-conical shaped section widening toward the exhaust conduit side of the member.

5. The device of claim 1, wherein, the bore is defined by a countersunk hole on an upper surface of the member connecting to the throat section, wherein the countersunk hole defines an annular space to surround the injector nozzle.

6. The device of claim 5, further comprising a boss formed on an upper surface of the member, the countersunk hole being formed into the boss.

7. An exhaust aftertreatment injector for an internal combustion engine having an opening on an exhaust conduit with an anti-fouling device, comprising:
an injector mountable on the opening of an exhaust conduit, the injector having a nozzle directed into the opening; and,
a plate member formed as a base part and an insert part, base part having a seat for the insert part, the plate member being positionable between the opening on an exhaust conduit and the injector, the plate member having a bore for alignment with the nozzle of the injector to allow a flow from the nozzle through the bore into the opening on the exhaust conduit, the bore being formed by aligned holes in the base part and the insert part and defined by a throat section providing a flow space surrounding the nozzle and a frusto-conical shaped section that widens from the throat section toward an exhaust conduit side of the member, the plate member having an inlet for receiving air from an air source and having a passageway formed by aligned passages in the base part and the inset part to guide air from the inlet to at least one outlet opening formed on a surface defining the throat section, the at least one outlet being oriented to direct air across the flow space around the nozzle.

8. The device of claim 7 wherein the outlet opening is formed as a nozzle.

9. The exhaust aftertreatment injector of claim 7, wherein the flow of air is directed to inhibit exhaust gas from contacting the nozzle.

* * * * *